(12) United States Patent
Lee et al.

(10) Patent No.: US 6,958,968 B2
(45) Date of Patent: Oct. 25, 2005

(54) OPTICAL HEAD WITH GRIN LENS

(75) Inventors: Myung-bok Lee, Suwon (KR); Petrov Nikolai, Suwon (KR); Gi-myung Woo, Suwon (KR)

(73) Assignee: Samsung Electronics Co., Ltd., Kyungi-do (KR)

( * ) Notice: Subject to any disclaimer, the term of this patent is extended or adjusted under 35 U.S.C. 154(b) by 520 days.

(21) Appl. No.: 10/133,363

(22) Filed: Apr. 29, 2002

(65) Prior Publication Data

US 2003/0016615 A1 Jan. 23, 2003

(30) Foreign Application Priority Data

Jul. 19, 2001 (KR) .......................................... 2001-43505

(51) Int. Cl.$^7$ ................................................. G11B 7/00
(52) U.S. Cl. ................................................. 369/112.23
(58) Field of Search ....................... 369/112.23, 112.24, 369/44.23, 44.24, 112.1, 44.11

(56) References Cited

U.S. PATENT DOCUMENTS

| | | | |
|---|---|---|---|
| 6,243,350 B1 * | 6/2001 | Knight et al. | 369/126 |
| 6,307,832 B1 * | 10/2001 | Novotny et al. | 369/300 |
| 6,351,436 B1 * | 2/2002 | Mallary | 369/13.17 |
| 6,582,630 B2 * | 6/2003 | Jain et al. | 264/1.1 |

FOREIGN PATENT DOCUMENTS

| | | |
|---|---|---|
| KR | 1998-702610 | 8/1998 |
| WO | WO 98/09284 A1 | 3/1998 |

\* cited by examiner

*Primary Examiner*—Nabil Hindi
(74) *Attorney, Agent, or Firm*—Sughrue Mion, PLLC

(57) ABSTRACT

An optical head in which a graded index (GRIN) lens is provided. The optical head includes a slider connected to an arm and flying a predetermined distance above a recording layer for data recording, a GRIN lens mounted in the slider for focusing an incident beam to form a light spot of a predetermined size on its exit surface adjacent to the recording layer, and a light-emitting unit for emitting the incident light to the GRIN lens.

20 Claims, 5 Drawing Sheets

OPTICAL HEAD WITH GRIN LENS

BACKGROUND OF THE INVENTION

This application is based on Korean Patent Application No. 2001-43505 filed Jul. 19, 2001, the disclosure of which is incorporated herein by reference in its entirety.

1. Field of the Invention

The present invention relates in general to an optical head, and more particularly to an optical head with a graded index (GRIN) lens.

2. Description of the Related Art

Optical pickups for recording data in or reading data from a high-density data storage medium, such as an optical disk, include a head for recording a predetermined data in a recording layer of the data storage medium or reading the data from the recording layer using a laser beam emitted from a laser diode.

The data recording density of a high-density data storage medium such as an optical disk is dependent on the spot size of a laser focused on the recording layer of the storage medium. The spot size depends upon the wavelength of a laser emitted from a laser diode for a header and the focusing power of an optical system including the header. The larger the data recording capacity, the shorter the wavelength of a laser beam for recording and the greater the focusing power of the optical lens system.

Increasing the recording density of a storage medium based on the above principle is limited by diffraction. Therefore, there is a need for a new optical head capable of increasing the recording density over the limitation by diffraction. As a result of the effort made to overcome the limitation by diffraction, a near-field optical head capable of ultra high-density data recording and reading based on evanescent coupling was developed recently.

FIG. 1 shows an optical system for a near-field optical head according to the prior art. In FIG. 1, reference numeral 2 denotes a disk and reference numeral 4 denotes a recording layer coated on the surface of the disk 2. An air-bearing flying slider 6 is shown adjacent to the recording layer 4. The flying slider 6 and the recording layer 4 may be spaced apart a distance that is less than the wavelength of a laser beam 13 for data recording. A solid immersion lens (SIL) 8 is mounted in the flying slider 6, coaxially with the flying slider 6, facing the recording layer 4 of the disk 2. The SIL 8 is a hemispherical or super-hemispherical lens having a flat surface that faces toward the recording layer 4 and a hemispherical or super-hemispherical surface that faces away from the recording layer 4. A magnetic field modulation coil 10 for correcting a head tilt is arranged around the SIL 8 in the flat surface of the flying slider 6 facing the recording layer 4. Also, an objective lens 12 is coaxially arranged above the flying slider 6.

The size of a laser spot condensed by the objective lens 12 markedly reduces while passing through the SIL 8. That is, the SIL 8 reduces the laser spot size to 1/n of the size before entering the SIL 8 (or to $1/n^2$ if the SIL 8 is a super-hemispherical lens), where n is the index of refraction of the SIL 8. This reduced laser spot size occurs on the bottom of the SIL 8, i.e., in the vicinity of the recording layer 4.

When the distance between the SIL 8 and the recording layer 4 is maintained to be less than the wavelength of the laser beam 13, the spot focused on the bottom of the SIL 8 is wholly transmitted onto the recording layer 4 through evanescent coupling, where the spot on the bottom of the SIL 8 and the spot on the recording layer 4 are the same in size, thereby enabling near-field recording.

The conventional near-field optical head shown in FIG. 1 increases the numerical aperture (NA) of the optical system by reducing the spot size of the laser beam 13 being focused onto the recording layer 4 using two lenses, i.e., the objective lens 12 and the SIL 8.

As the NA of an optical system is increased, the range of the dimensional tolerance of the optical elements constituting the optical system becomes narrow. Therefore, there is a need to accurately adjust the spacing between the SIL 8 and the recording layer 4 without tilting or decentering the objective lens 12 in order to reduce aberrations in the optical system having the optical head shown in FIG. 1, which increases the manufacturing costs of the optical head.

The conventional optical head shown in FIG. 1, which uses both the objective lens 12 and the SIL 8, also has a problem of access speed reduction due to its increased volume and weight.

FIG. 2 shows the structure of an optical system of another optical head configured to solve the problems of the optical head shown in FIG. 1. The optical head shown in FIG. 2 uses a graded index (GRIN) lens. For convenience, a semiconductor laser diode, which is disposed on the left side of the GRIN lens 14 in FIG. 2, for emitting a laser beam for recording is not illustrated; only radiation of a laser beam from the semiconductor laser diode is illustrated. In FIG. 2, reference numeral 8 denotes an SIL.

The optical system of the conventional optical head shown in FIG. 2 using the GRIN lens 14 and the SIL 8 can reduce aberrations in the optical system and can increase the NA with a simple configuration. However, this optical system still needs a coaxial alignment between the GRIN lens 14 and the SIL 8, and it is difficult to implement the above described optical system in a miniature, light-weight optical head.

FIG. 3 shows an optical system of another conventional optical head using a GRIN lens. A metal layer 16 is attached to an surface of the GRIN lens 14, facing a recording layer (not shown). A hole 18 is formed in the metal layer 16 to expose a portion of the surface of the GRIN lens 14. The metal layer 16 limits laser emission through the GRIN lens 14. In FIG. 3, reference numeral 20 denotes a semiconductor laser diode for emitting a laser beam towards the GRIN lens 14 through an objective lens 12.

The conventional optical head shown in FIG. 3, which uses the metal layer 16 instead of an SIL, has structure that is simpler than that of the optical head shown in FIG. 2. However, it is difficult to form the hole 18 at the center of the metal layer 16 to be aligned with the optical axis. For example, it is very difficult to form the metal layer 16 on the surface of the GRIN lens 14 having a 200-$\mu$m diameter, and to form the hole 18 having a 100-nm diameter at the center of the metal layer 16.

Although a slit of a desired size can be formed by partially melting and vaporizing the metal layer 16, suitable materials therefor, which have low reflectance, high absorbance, and low melting point, are extremely limited. In addition, when the slit is smaller than the wavelength of a laser beam passing through the same, light transmitting efficiency, expressed as a ratio of the output beam intensity to the input beam intensity, is lowered. For example, in a near-field probe head using an optical fiber, the light transmitting efficiency is about $10^{-4}$–$10^{-7}$ for a slit of 100 nm. In this aspect, the optical head shown in FIG. 3 is unsuitable for practical use in the field due to its poor optical efficiency.

SUMMARY OF THE INVENTION

To solve the above-described problems, it is an object of the present invention to provide an optical head capable of data access at a high speed with a simple configuration and capable of focusing a light spot of a desired size with a high optical efficiency. Also, the optical head is easy to manufacture.

To achieve these objects, the optical head includes a slider connected to an arm and flying a predetermined distance above a recording layer for data recording, a GRIN lens mounted in the slider for focusing an incident beam to form an exit light spot of a predetermined size on an exit surface adjacent to the recording layer, and a light-emitting unit for emitting the incident light to the GRIN lens.

It is preferable that the GRIN lens is a single GRIN lens including two regions having gradient-index parameters that radially vary and satisfy the following condition:

$$\omega_1 < \omega_2$$

where $\omega_1$ is the gradient-index parameter of a first region that is located close to the light-emitting unit, and where $\omega_2$ is the gradient-index parameter of a second region that is located close to the recording layer.

It is preferable that the second region be formed to protrude from a bottom of the first region, such that the second region is coplanar with the bottom surface of the slider, which is adjacent to the recording layer. Preferably, the second region has a tapered shape, such that its diameters decrease toward the recording layer, or has a cylindrical shape with a constant diameter. Preferably, the first region has a predetermined length to form a first light spot of the incident beam on a boundary surface between the first and the second regions. Preferably, the second region has a predetermined length to form the exit light spot of the incident beam, which is smaller than the first light spot, on an exit surface of the second region.

It is preferable that the light-emitting unit is a semiconductor laser diode that is separated a predetermined distance from the first region, or a semiconductor laser diode arranged on an entry surface of the first region. When a semiconductor laser diode is used as the light-emitting unit, it is preferable that the optical head further includes a heat sink that is interposed between the semiconductor laser diode and the entry surface of the first region. The heat sink is operative to cool the semiconductor laser diode and the first region by absorbing the heat generated from the same during laser oscillation.

Alternatively, the GRIN lens of the optical head according the present invention may comprise separate first and second GRIN lenses respectively having gradient-index parameters that radially vary and satisfy the following condition:

$$\omega_1 < \omega_2$$

where $\omega_1$ is the gradient-index parameter of the first GRIN lens and $\omega_2$ is the gradient-index parameter of the second GRIN lens. In this case, it is preferable that the first GRIN lens is fixed in a hole of the slider and the second GRIN lens is formed to protrude from a predetermined bottom center region of the first GRIN lens, such that the second GRIN lens is coplanar with the bottom surface of the slider adjacent to the recording layer. It is preferable that the second GRIN lens comprises a plurality of stacked GRIN lenses respectively having (1) diameters that gradually decrease toward the recording layer and (2) gradient-index parameters that gradually increase toward the recording layer.

According to the present invention, the optical head has a simple configuration including planar GRIN lenses and thus its assembly is easy. In addition, the optical head enables high-speed data access due to its compact, light-weight structure. A light spot of a desired size can be focused by using two GRIN lenses that contact each other with reduced light loss.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
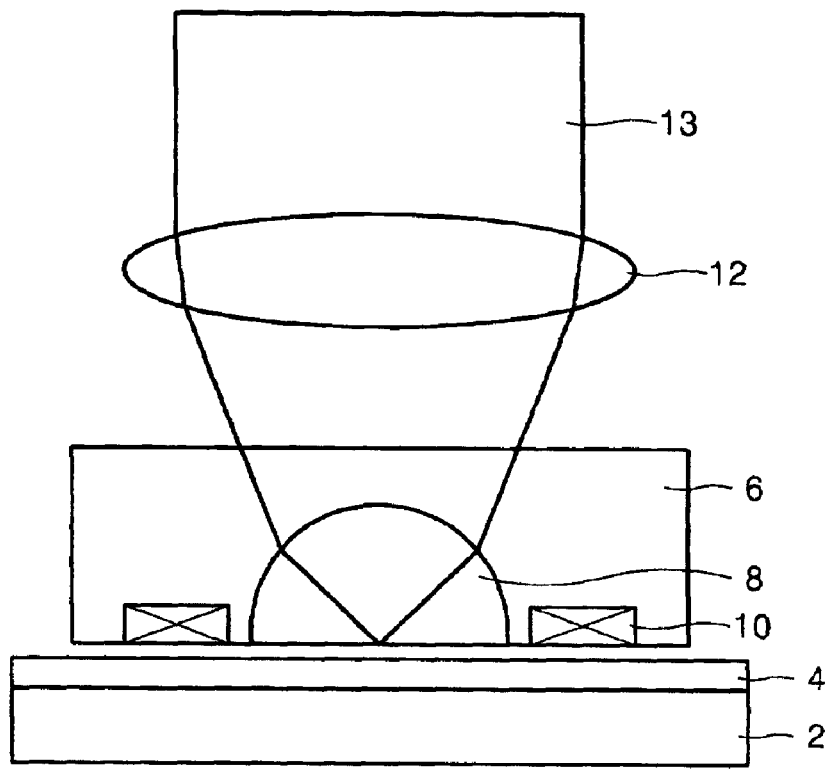
FIGS. 1 through 3 are diagrammatic views of conventional structures of optical systems for optical heads.
Figure 2:
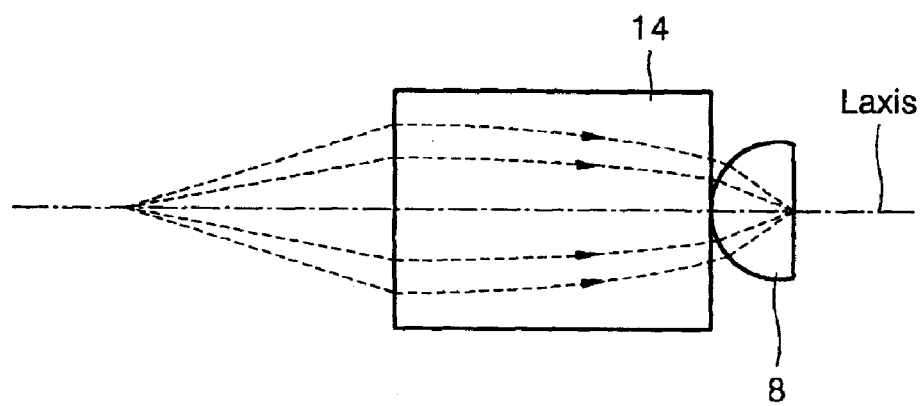
Figure 3:
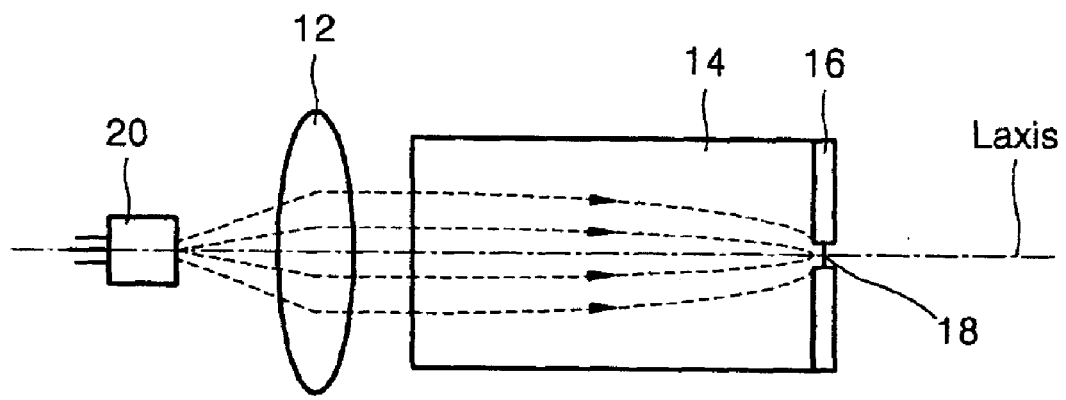

Illustrative, non-limiting embodiments of a near-field optical head with a graded index (GRIN) lens according to the present invention will be described with reference to the appended drawings. In the drawings, the thickness of layers and regions are exaggerated for clarity.

GRIN lenses for optical heads according to the preferred embodiments of the present invention now will be described.

Figure 4:
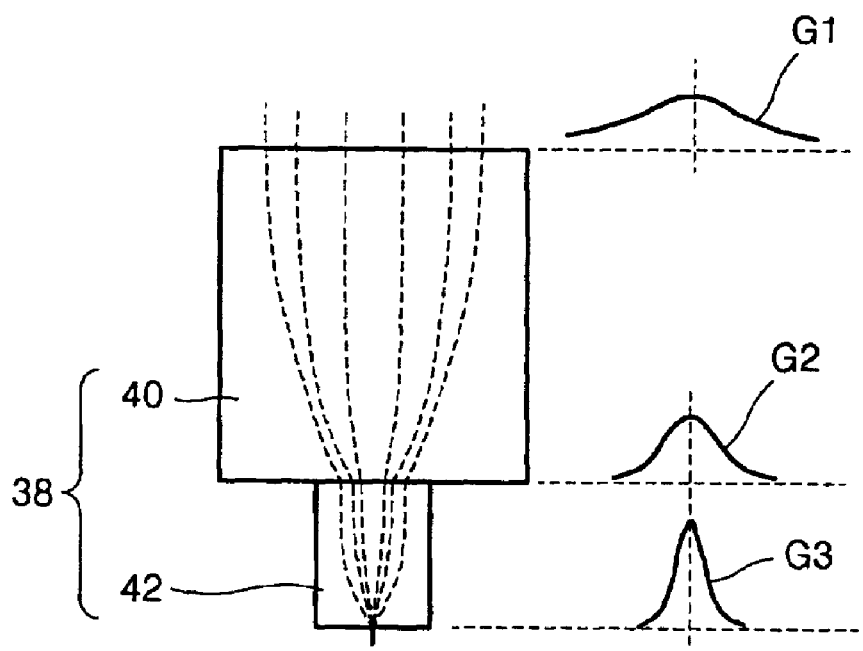
FIGS. 4, 5A, and 5B are diagrammatic views of non-limiting, alternative embodiments of a GRIN lens of a near-field optical head according to the present invention, and the distribution of refractive index for each GRIN lens.

FIG. 4 is a sectional view of a GRIN lens 38, which is disposed between a semiconductor laser diode (not shown) and a recording layer of an optical disk (not shown), in an optical system of a preferred embodiment of the optical head according to the present invention. Referring to FIG. 4, the GRIN lens 38 includes a first GRIN lens 40 and a second GRIN lens 42. The first and second GRIN lenses 40 and 42 are preferably formed as a single piece, but can also be formed as two separate pieces. When the first and second GRIN lenses 40 and 42 are formed as separate pieces, an entry surface of the second GRIN lens 42, preferably coaxially, contacts an exit surface of the first GRIN lens 40. The entire entry surface of the second GRIN lens 42 contacts a predetermined axial region of the exit surface of the first GRIN lens 40.

The first GRIN lens 40 has a gradient-index parameter that controls the size of a first spot to be formed on its exit surface (the entry surface of the second GRIN lens 42) from a laser beam entering through its entry surface. The second GRIN lens 42 has a gradient-index parameter according to which a second spot smaller than the first spot is formed on its exist surface. In designing the first and second GRIN lenses 40 and 42, each gradient-index parameter thereof is determined such that a second spot of a desired size can be formed on the exit surface of the second GRIN lens 42.

The size of a laser spot formed on the exit surface of a GRIN lens and a gradient-index parameter of the GRIN lens used for focusing the laser spot have the following relationships.

Assuming that the first GRIN lens 40 has an index of refraction $n_0$ on the optical axis, an index of refraction $n_c$ at a particular radius a, and $\Delta=(n_0-n_c)/n_c$, then a radial distribution $n^2$ of the refractive index, a gradient-index parameter $\omega_1$, and a length L of the first GRIN lens 40 are expressed as the following formulae (1), (2), and (3), respectively:

$$n^2 = n_0^2 - \omega_1^2 r^2 \quad (1)$$

$$\omega_1 = ((2\Delta)n_0/a)^{1/2} \quad (2)$$

$$L \approx \pi(n_0 2\omega_1)(1+(3(4+K^2W_0^4\omega_1^2)/(8K^2n_0^2W_0^2))), \text{ where } K=2\pi/\lambda \quad (3)$$

In formula (1), r is the outer radius of the first GRIN lens 40.

Referring to FIG. 4, reference character G1 denotes the intensity profile of a laser beam at the entry surface of the first GRIN lens 40. If $W_0$ denotes a FWHM (full-width at half maximum) of the laser beam in the intensity profile G1, at which the intensity is decreased to 1/e, and $W_f$ denotes a FWHM in the intensity profile G2 of the laser beam at the exit surface of the first GRIN lens 40, then the following relationship is satisfied:

$$W_f = \lambda/(\pi W_0 \omega_1) \quad (4)$$

In formula (4) above, the wavelength $\lambda$ of a laser beam for data recording is determined upon selection of a semiconductor laser diode. A laser spot of a desired size focused on the exit surface of the first GRIN lens 40, i.e., a desired FWHM $W_f$, can be obtained by varying the gradient-index parameter $\omega 1$ of the first GRIN lens 40 and/or the FWHM $W_0$ of the laser beam on the entry surface of the first GRIN lens 40.

Once the gradient-index parameter $\omega_1$ of the first GRIN lens 40 and/or the FWHM $W_0$ of the laser beam on the entry surface of the first GRIN lens 40 for a laser spot of a desired size are determined, the length of the first GRIN lens 40 can be determined using the formula (3) above.

The above formulae (1) through (4) used for designing the first GRIN lens 40 are applied to the second GRIN lens 42. Here, a FWHM of the laser beam in the intensity profile G2 at the entry surface of the second GRIN lens 42 is equal to the FWHM $W_f$ at the exit surface of the first GRIN lens 40. As is apparent from the intensity profile G3 of a laser beam at the exit surface of the second GRIN lens 42, the FWHM at the exit surface of the second GRIN lens 42 is preferably smaller than the FWHM on the entry surface of the second GRIN lens 42. Therefore, it is preferable that a gradient-index parameter $\omega_2$ of the second GRIN lens 42 is larger than the gradient-index parameter $\omega_1$ of the first GRIN lens 40. Accordingly, the length of the second GRIN lens 42 calculated using formula (3) above is shorter than the length of the first GRIN lens 40.

Figure 5A:
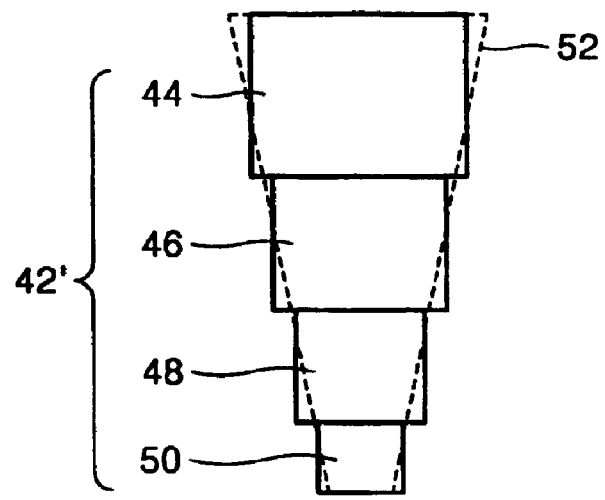

FIG. 5A shows a modification of the second GRIN lens 42 shown in FIG. 4. The second GRIN lens 42' includes a plurality of serially connected GRIN lenses 44, 46, 48, and 55. An entry surface of the third GRIN lens 44 contacts the exit surface of the first GRIN lens 40 (see FIG. 4) in a similar manner as the second GRIN lens 42 shown in FIG. 4, and an entry surface of the fourth GRIN lens 46 contacts an exit surface of the third GRIN lens 44 in a similar manner above. Also, the fifth GRIN lens 48 and the sixth GRIN lens 50 contact the fourth GRIN lens 46 and the fifth GRIN lens 48, respectively, in a similar manner as the connection between the third and fourth GRIN lenses 44 and 46.

Preferably, the spot size (or FWHM) formed on each exit surface of the third through sixth GRIN lenses 44, 46, 48, and 50 is gradually decreased while a laser beam passes the third through sixth GRIN lenses 44, 46, 48, and 50.

The formulae (1) through (4) above can be applied to each of the third through sixth GRIN lenses 44, 46, 48, and 50. As is apparent from formula (4) above, the larger the gradient-index parameter $\omega_1$ of a GRIN lens, the smaller the FWHM $W_f$ of a laser beam at the exit surface of the GRIN lens. Accordingly, a laser spot (or FWHM) formed on each exit surface of the third through sixth GRIN lenses 44, 46, 48 and 50 becomes smaller while passing the third through sixth GRIN lenses 44, 46, 48, and 50 in sequence. Thus, the following relationship should be satisfied between respective gradient-index parameters $\omega_3$, $\omega_4$, $\omega_5$ and $\omega_6$ of the third through sixth GRIN lenses 44, 46, 48, and 50.

$$\omega_3 < \omega_4 < \omega_5 < \omega_6 \quad (5)$$

According to formula (3) above, the length of a GRIN lens becomes shorter with an increased gradient-index parameter of the GRIN lens. The lengths of the third through sixth GRIN lenses 44, 46, 48, and 50 gradually shorten starting from the third GRIN lens 44, such that the sixth GRIN lens 50 has the shortest length.

Figure 5B:
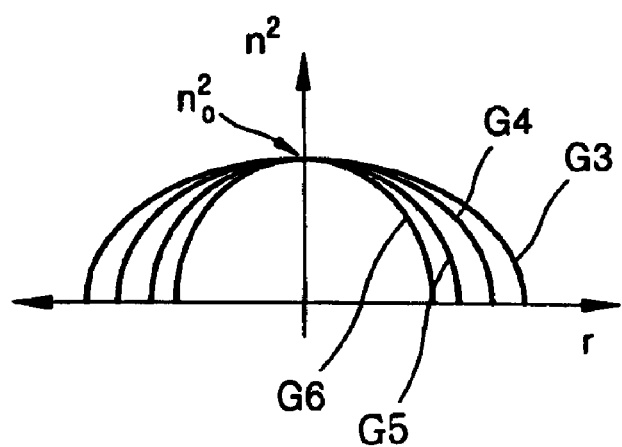

FIG. 5B shows the refractive index distribution $n^2$ in a radial direction r for the third through sixth GRIN lenses 44, 46, 48, and 50. In FIG. 5B, reference characters G3 through G6 denote the respective radial distributions of refractive index for the third through sixth GRIN lenses 44, 46, 48 and 50. The radial distribution of refractive index becomes close to a hemispherical distribution starting from the third GRIN lens 44 and moving toward the sixth GRIN lens 50.

When the second GRIN lens 42 shown in FIG. 4 is composed of a plurality of GRIN lenses, the formulae (1) through (4) are applied to each GRIN lens and the formula (5) is applied among the GRIN lenses. The lengths of the respective GRIN lenses are decreased starting from the first GRIN lens.

Alternatively, the second GRIN lens 42 may be constructed as a tapered GRIN lens 52, as shown in phantom in FIG. 5A, which tapers away from the first GRIN lens 40. This tapered GRIN lens 52 corresponds to a second GRIN lens composed of a number of GRIN lenses. The tapered GRIN lens 52 has continuous gradient-index parameters.

The GRIN lenses described with reference to FIGS. 4 and 5 have high optical efficiencies. For example, if the first GRIN lens 40 is a cylindrical lens having a 200-$\mu$m diameter and 300-$\mu$m length, and if the second GRIN lens 42 is a cylindrical lens having a 10-$\mu$m diameter and a length of 15–20-$\mu$m, then a laser spot of several micrometers is formed on the entry surface of the second GRIN lens 42 and a laser spot of about 300 nm is formed on the exit surface of the second GRIN lens 42, with an optical efficiency of 80–90%.

An optical head incorporating the GRIN lenses described above will be described below. The same elements as those described above are denoted by the same reference numerals as those used above.

Illustrative, Non-limiting, Embodiment 1

Figure 6:
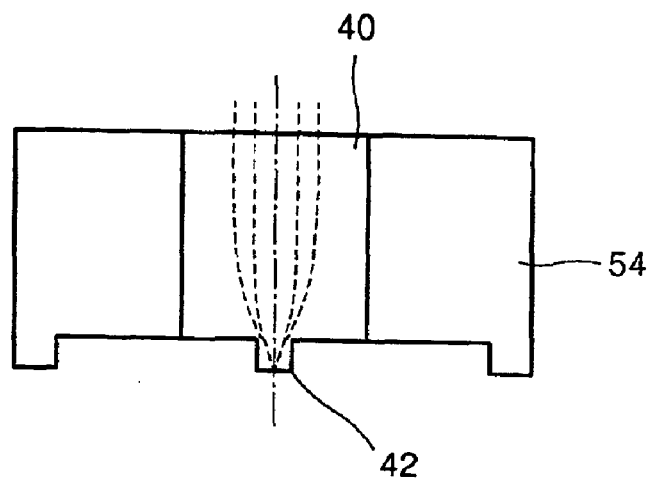
FIGS. 6 and 7 are diagrammatic views of illustrative, non-limiting, first and second embodiments of the near-field optical head with a GRIN lens according to the present invention.

Referring to FIG. 6, reference numeral 54 denotes a slider of an optical head. A GRIN lens (see FIG. 4) composed of the first and second GRIN lenses 40 and 42 is formed in the middle of the slider 54. The second GRIN lens 42 protrudes from the exit surface of the first GRIN lens 40. A recording layer of an optical disk (not shown) is positioned in the vicinity of the bottom surface of the slider 54. Preferably, the second GRIN lens 42 protrudes to an extent to be coplanar with the bottom surface of the slider 54.

When the optical head approaches the optical disk for data recording, the spacing between the recording layer of the optical disk and the slider 54 is maintained to be less than the wavelength of a laser beam for recording, for example, about 20 nm, which is the same as the spacing between the second GRIN lens 42 and the recording layer. The thin layer of air between the second GRIN lens 42 and the recording layer allows evanescent coupling between the second GRIN lens 42 and the recording layer so that a fine laser spot focused on the exit surface of the second GRIN lens 42 can jump the air layer intact to the recording layer. Thus, a fine mark can be formed on the recording layer, enabling high-density information recording.

The second GRIN lens 42 of FIG. 6 may be the GRIN lens composed of the third through sixth GRIN lenses 44, 46, 48, and 50, respectively, or the tapered GRIN lens 52 shown in FIG. 5A.

Illustrative, Non-limiting, Embodiment 2

The first embodiment of the optical head (FIG. 6) according to the present invention includes a semiconductor laser diode (not shown) for laser radiation onto the entry surface of the first GRIN lens 40. The semiconductor laser diode is spaced apart a predetermined distance from the entry surface of the first GRIN lens 40.

Figure 7:
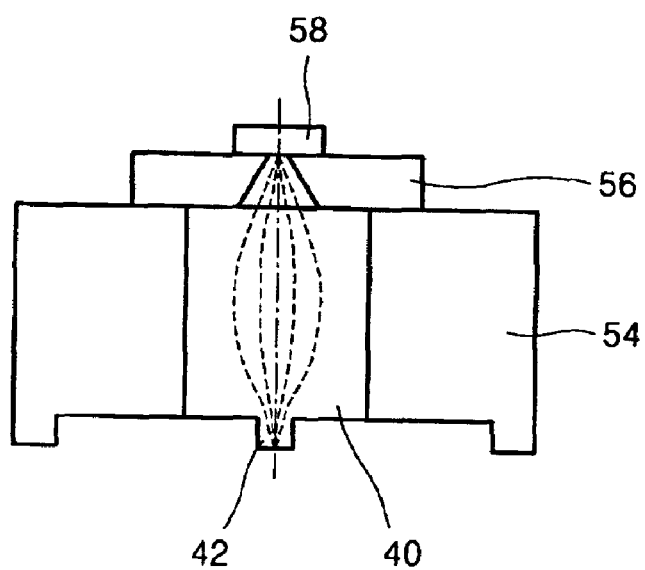

According to a second embodiment of the optical head, as shown in FIG. 7, (1) a heat sink 56 is provided on the slider 54, above the first GRIN lens 40, and (2) a semiconductor laser diode 58 is provided on the heat sink 56. Similar to the first embodiment, however, the second GRIN lens 42 of the second embodiment may be replaced by the GRIN lens 42' or the tapered GRIN lens 52 shown in FIG. 5A.

The second embodiment of the optical head including both the semiconductor laser diode 58 and the heat sink 56 on the slider 54 can advantageously achieve a small, light-weight structure and thus can increase the head access speed.

Referring to FIG. 7, the heat sink 56, which cools the first GRIN lens 40 and the semiconductor laser diode 58, is formed around the optical axis. The semiconductor laser diode 58 is placed on the heat sink 56 to be coaxially aligned with the optical system mounted in the slider 54. The heat sink 56 has a tapered inner wall that surrounds a diverging laser beam emitted from the semiconductor laser diode 58 toward the entry surface of the first GRIN lens 40 intact.

Figure 8:
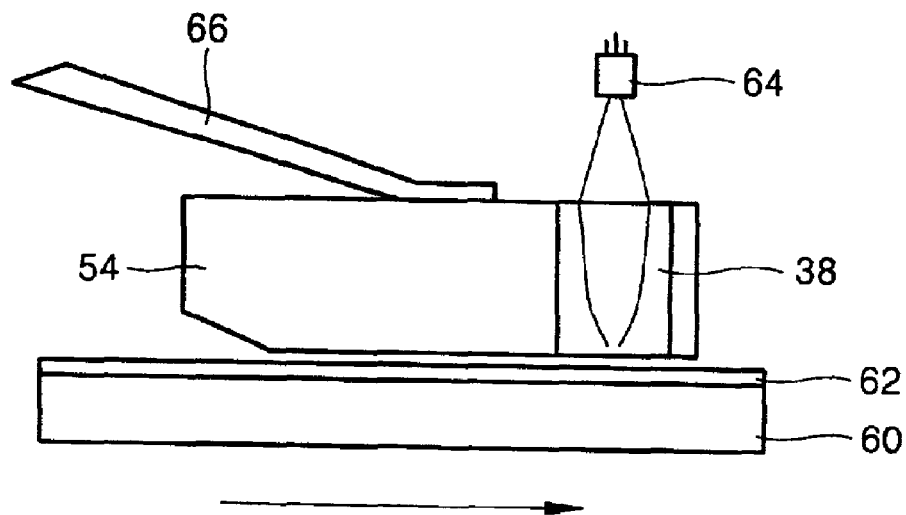
FIGS. 8 and 9 are partial sectional views of optical recording apparatuses including the optical heads with a GRIN lens shown in FIGS. 6 and 7.

FIG. 8 is a partial sectional view of an optical recording apparatus incorporating the first embodiment of the optical head according to the present invention. In FIG. 8, reference numeral 60 denotes an optical disk, reference numeral 62 denotes a recording layer coated on the optical disk 60, reference numeral 64 denotes a laser diode for emitting a laser onto a GRIN lens 38, and reference numeral 66 denotes a flexure suspension for connecting an air-bearing flying slider 54 to an arm. Also, an arrow below the optical disk 60 represents a direction in which the optical disk 60 is rotated. The air-bearing flying slider 54 flies a predetermined distance above the recording layer 62 by high-speed rotation of the optical disk 60.

Figure 9:
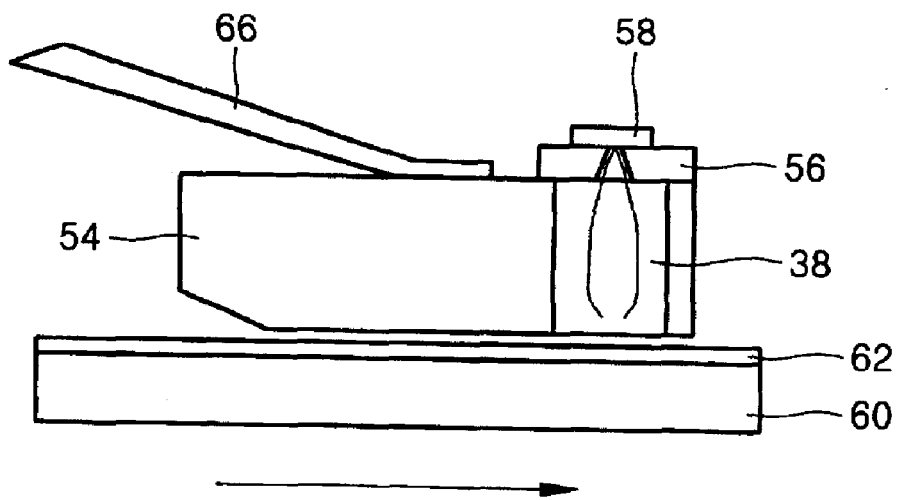

FIG. 9 is a partial sectional view of an optical recording apparatus incorporating the second embodiment of the optical head according to the present invention. The structure of the optical recording apparatus of FIG. 9 is the same as the optical recording apparatus of FIG. 8, with the exception that the heat sink 56 and the semiconductor laser diode 58 are sequentially stacked on the slider 54 and the GRIN lens 38.

Methods for fabricating the first and second embodiments of the optical heads according to the present invention will be described below.

For the first embodiment of the optical head shown in FIG. 6, a hole is first formed in a substrate of the slider 54. Next, the first GRIN lens 40 is inserted into the hole to be coplanar with the substrate. The bottom of the substrate is etched by a mechanical process or photolithography to form an air-bearing surface (ABS). In this process, the second GRIN lens 42 is formed as a tip on the bottom, i.e., the exit surface, of the first GRIN lens 40, as shown in FIG. 6. The second GRIN lens 42 may be the second GRIN lens 42 or 42' shown in FIG. 4 or FIG. 5A. Next, a predetermined radial distribution of refractive index is induced to the tip by ion exchange. The distribution of refractive index in the radial direction of the tip varies depending on the distance of ion diffusion. Assuming that the tip is cylindrical, the axial distribution of refractive index along the height of the cylindrical tip is constant.

When the tip is a tapered GRIN lens 52 as shown in FIG. 5A, the radial distribution of refractive index in the tip should be varied at each height point through appropriate adjustment of annealing temperature and time.

For the second embodiment of the optical head according to the present invention, additional steps of mounting the heat sink 56 over the slider 54 and the first GRIN lens 40 and mounting the semiconductor laser diode 58 on the heat sink 56 are involved, as compared to the first embodiment of the optical head.

As described above, an optical head according to the present invention uses a GRIN lens to focus a laser spot onto a recording layer. The GRIN lens includes first and second GRIN lenses with gradually increasing gradient-index parameters to focus a laser spot of a desired fine size and thereby to record data at ultra high densities. The optical head including a slider has a simple structure because of the use of planar first and second GRIN lenses. In addition, the optical head can be easily assembled by forming a hole in a slider and inserting the GRIN lens into the hole. The resulting optical head enables high-speed data access due to its compact, light-weight structure. Unlike the conventional GRIN lens with a metal layer at its exit surface, a desired fine spot can be formed without light loss so that the optical efficiency of the optical head is improved.

While this invention has been particularly shown and described with reference to preferred embodiments thereof, it will be understood by those skilled in the art that various changes in form and details may be made therein without departing from the spirit and scope of the invention as defined by the appended claims. For example, it will be appreciated by those skilled in the art that an air-bearing surface may be formed first at the bottom of a slider substrate, followed by formation of a hole and insertion of a combination GRIN lens including the first and second GRIN lenses 40 and 42 into the hole.

What is claimed is:

1. An optical head comprising:
    a slider adapted to fly a predetermined distance above a recording layer for data recording;
    a graded index (GRIN) lens mounted on the slider for focusing an incident beam of light to form an exit light spot of a predetermined size on an exit surface of the GRIN lens; and
    a light-emitting unit for emitting the incident beam of light to the GRIN lens;
    wherein the exit surface is not covered by a layer that limits light emission through the GRIN lens from the incident beam of light; and
    wherein the GRIN lens forms the exit light spot of the predetermined size on the exit surface by multistage focusing.

2. The optical head of claim 1, wherein the exit surface of the GRIN lens is coplanar with a bottom surface of the slider adjacent to the recording layer.

3. The optical head of claim 1, wherein the GRIN lens is a single GRIN lens including a first region and a second region respectively having gradient-index parameters that radially vary and satisfy the following condition:

$$\omega_1 < \omega_2$$

where ω1 is the gradient-index parameter of the first region, which is located toward the light-emitting unit, and where $\omega_2$ is the gradient-index parameter of the second region, which is located toward the recording layer.

4. The optical head of claim 3, wherein the second region protrudes from the first region, such that the second region is coplanar with the bottom surface of the slider.

5. The optical head of claim 4, wherein the second region one of (1) has a shape that tapers toward the recording layer, and (2) has a cylindrical shape with a constant diameter.

6. The optical head of claim 5, wherein the first region has a predetermined length to form a first light spot of the incident beam on a boundary surface between the first region and the second region.

7. The optical head of claim 6, wherein the second region has a predetermined length to form the exit light spot of the incident beam, which is smaller than the first light spot.

8. The optical head of claim 7, wherein the light-emitting unit is a semiconductor laser diode separated a predetermined distance from the first region.

9. The optical head of claim 7, wherein the light-emitting unit is a semiconductor laser diode arranged on an entry surface of the first region.

10. The optical head of claim 9, further comprising:
a heat sink interposed between the semiconductor laser diode and the entry surface of the first region, the heat sink being operative cool the semiconductor laser diode and the first region by absorbing heat generated during laser oscillation.

11. The optical head of claim 1, wherein the GRIN lens comprises a first GRIN lens and a second GRIN lens respectively having gradient-index parameters that radially vary and satisfy the following condition:

$$\omega_1 < \omega_2$$

where $\omega_1$ is the gradient-index parameter of the first GRIN lens, and where $\omega_2$ is the gradient-index parameter of the second GRIN lens.

12. The optical head of claim 11, wherein the first GRIN lens is fixed in a hole of the slider, and wherein the second GRIN lens protrudes from a bottom center region of the first GRIN lens, such that the second GRIN lens is coplanar with the bottom surface of the slider.

13. The optical head of claim 12, wherein the second GRIN lens one of (1) has a shape that tapers toward the recording layer, and (2) has a cylindrical shape with a constant diameter.

14. The optical head of claim 13, wherein the first GRIN lens has a predetermined length to form a first light spot of the incident beam on an exit surface of the first GRIN lens, which is in contact with the an entry surface of the second GRIN lens.

15. The optical head of claim 14, wherein the second GRIN lens has a predetermined length to form the exit light spot of the incident beam, which is smaller than the first light spot.

16. The optical head of claim 15, wherein the light-emitting unit is a semiconductor laser diode separated a predetermined distance from the first GRIN lens.

17. The optical head of claim 15, wherein the light-emitting unit is a semiconductor laser diode arranged on an entry surface of the first GRIN lens.

18. The optical head of claim 17, further comprising:
a heat sink interposed between the semiconductor laser diode and the entry surface of the first GRIN lens, the heat sink operative to cool the semiconductor laser diode and the first GRIN lens by absorbing heat generated during laser oscillation.

19. An optical head, comprising:
a slider, adapted to fly a predetermined distance above a recording layer, for data recording;
a graded index (GRIN) lens mounted on the slider for focusing an incident beam of light to form an exit light spot of a predetermined size on an exit surface of the GRIN lens, the GRIN lens comprising:
a first GRIN lens, fixed in a hole of the slider and having a gradient-index parameter $\omega_1$ that radially varies, and
a second GRIN lens, protruding from a bottom center region of the first GRIN lens, such that the second GRIN lens is coplanar with the bottom surface of the slider and having a gradient-index parameter $\omega_2$ that varies radially,
where $\omega_1 < \omega_2$;
a light-emitting unit for emitting the incident beam of light to the GRIN lens;
wherein the exit surface of is not covered by a layer that limits light emission through the GRIN lens from the incident light;
wherein the second GRIN lens has one of a shape that tapers toward the recording layer and a cylindrical shape with a constant diameter; and
wherein the second GRIN lens includes a plurality of stacked GRIN lenses respectively having (1) diameters that decrease toward the recording layer and (2) gradient-index parameters that increase toward the recording layer.

20. The optical head of claim 19, wherein each of the plurality of GRIN lenses forming the second GRIN lens has a predetermined length to form a light spot on a respective exit surface that is smaller than a light spot formed on the exit surface of the preceding GRIN lens.

* * * * *